(12) United States Patent
Ferren

(10) Patent No.: US 11,347,234 B2
(45) Date of Patent: May 31, 2022

(54) PATH SELECTION

(71) Applicant: Deere & Company, Moline, IL (US)

(72) Inventor: Bran Ferren, Beverly Hills, CA (US)

(73) Assignee: DEERE & COMPANY, Moline, IL (US)

( * ) Notice: Subject to any disclaimer, the term of this patent is extended or adjusted under 35 U.S.C. 154(b) by 384 days.

(21) Appl. No.: 16/669,029

(22) Filed: Oct. 30, 2019

(65) Prior Publication Data

US 2021/0132621 A1    May 6, 2021

(51) Int. Cl.
| | |
|---|---|
| *G05D 1/02* | (2020.01) |
| *G05D 1/00* | (2006.01) |
| *G06V 20/10* | (2022.01) |
| *G06V 20/58* | (2022.01) |

(52) U.S. Cl.
CPC ......... *G05D 1/0246* (2013.01); *G05D 1/0088* (2013.01); *G05D 1/0212* (2013.01); *G06V 20/188* (2022.01); *G06V 20/584* (2022.01); *G05D 2201/0201* (2013.01)

(58) Field of Classification Search
CPC .. G05D 1/0246; G05D 1/0088; G05D 1/0212; G05D 2201/0201; G05D 1/0044; G06K 9/00657; G06K 9/00825; G06K 9/00791
See application file for complete search history.

(56) References Cited

U.S. PATENT DOCUMENTS

| | | |
|---|---|---|
| 10,077,045 B2 | 9/2018 | Kiyokawa et al. |
| 10,101,743 B2 | 10/2018 | Abe et al. |
| 10,378,896 B2 * | 8/2019 | Birnie .................. G05D 1/0278 |
| 2014/0156182 A1 * | 6/2014 | Nemec ............... B62D 15/0295 |
| | | 701/430 |
| 2017/0118915 A1 | 5/2017 | Middelberg et al. |
| 2018/0373264 A1 | 12/2018 | Madsen et al. |
| 2020/0299930 A1 * | 9/2020 | Wuisan ................. E02F 9/2004 |

* cited by examiner

*Primary Examiner* — Marthe Y Marc-Coleman

(57) ABSTRACT

In accordance with an example embodiment, a method of controlling a work vehicle includes sensing a surrounding environment of a work vehicle with a sensor, identifying an item of interest, determining a path toward or away from the item using the work vehicle's position, heading, and velocity, displaying the path, receiving a special steer command, steering the work vehicle based on the special steer command if the special steer command is received when no path is being displayed on the operator display, and autonomously controlling the work vehicle to travel along the path based on the special steer command if the special steer command is received while the path is being displayed on the operator display.

20 Claims, 4 Drawing Sheets

PATH SELECTION

TECHNICAL FIELD

The present disclosure generally relates to a method for selecting a path for a work vehicle.

BACKGROUND

Work vehicles may use sensors and reference information to identify items in the environment surrounding the work vehicle. Work vehicles may also generate a path to a destination based on the current position, heading, and velocity of the work vehicle.

SUMMARY

Various aspects of examples of the present disclosure are set out in the claims.

According to a first aspect of the present disclosure, a method for controlling a work vehicle may include sensing a surrounding environment of the work vehicle with a sensor, identifying an item of interest in the surrounding environment, determining a path using at least one of the work vehicle's position, heading, and velocity, the path leading toward or around the item of interest, displaying, on an operator display visible to an operator of the work vehicle, the path, receiving, from an operator input used to steer the work vehicle, a special steer command, steering the work vehicle based on the special steer command if the special steer command is received when no path is being displayed on the operator display, and autonomously controlling the work vehicle to travel along the path based on the special steer command if the special steer command is received while the path is being displayed on the operator display.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 4 of the drawings.

Figure 1:
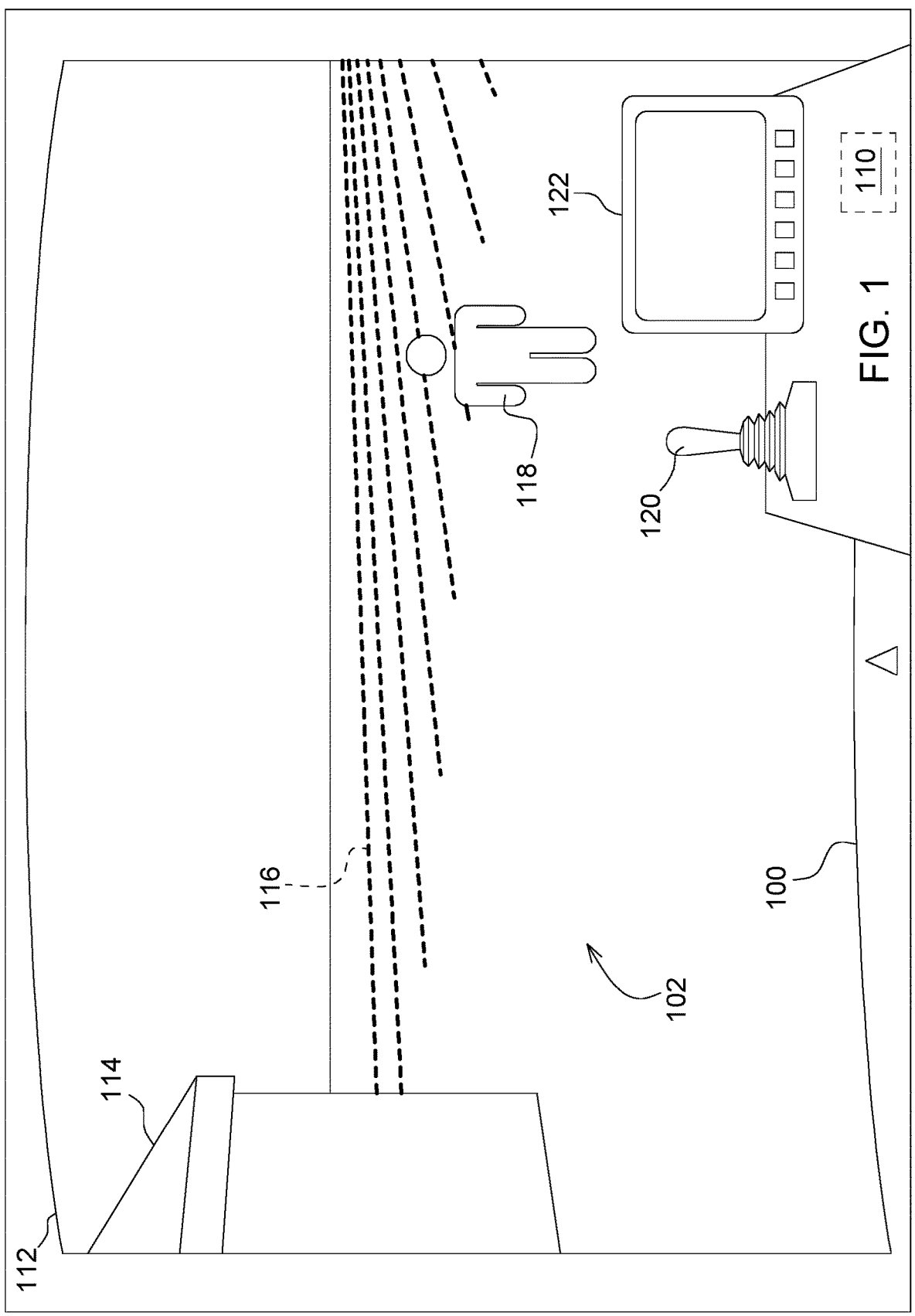
FIG. 1 is a view from the operator's position in the cab of a work vehicle.
Figure 2:
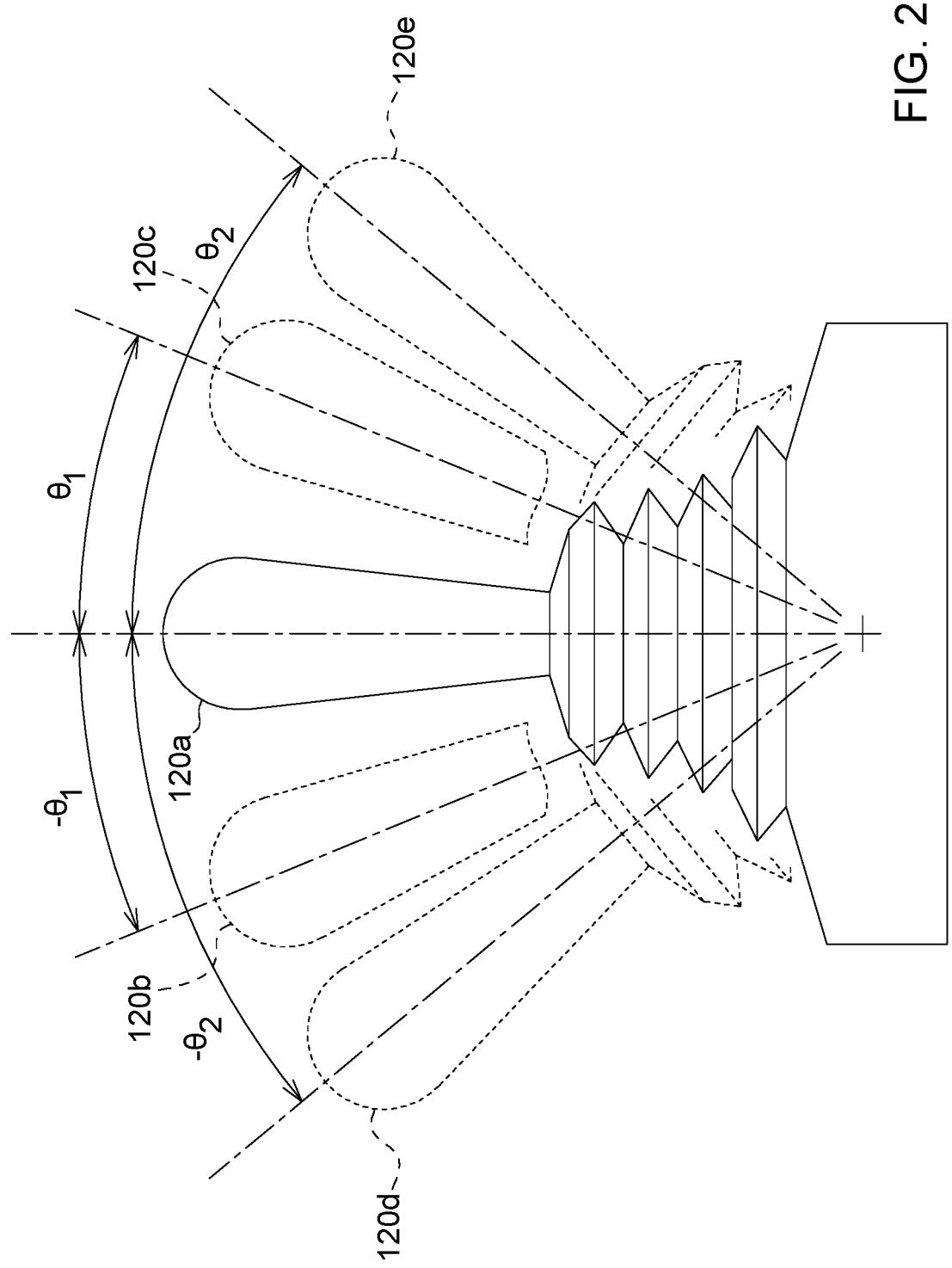
FIG. 2 is an operator input used to steer the work vehicle.
Figure 3:
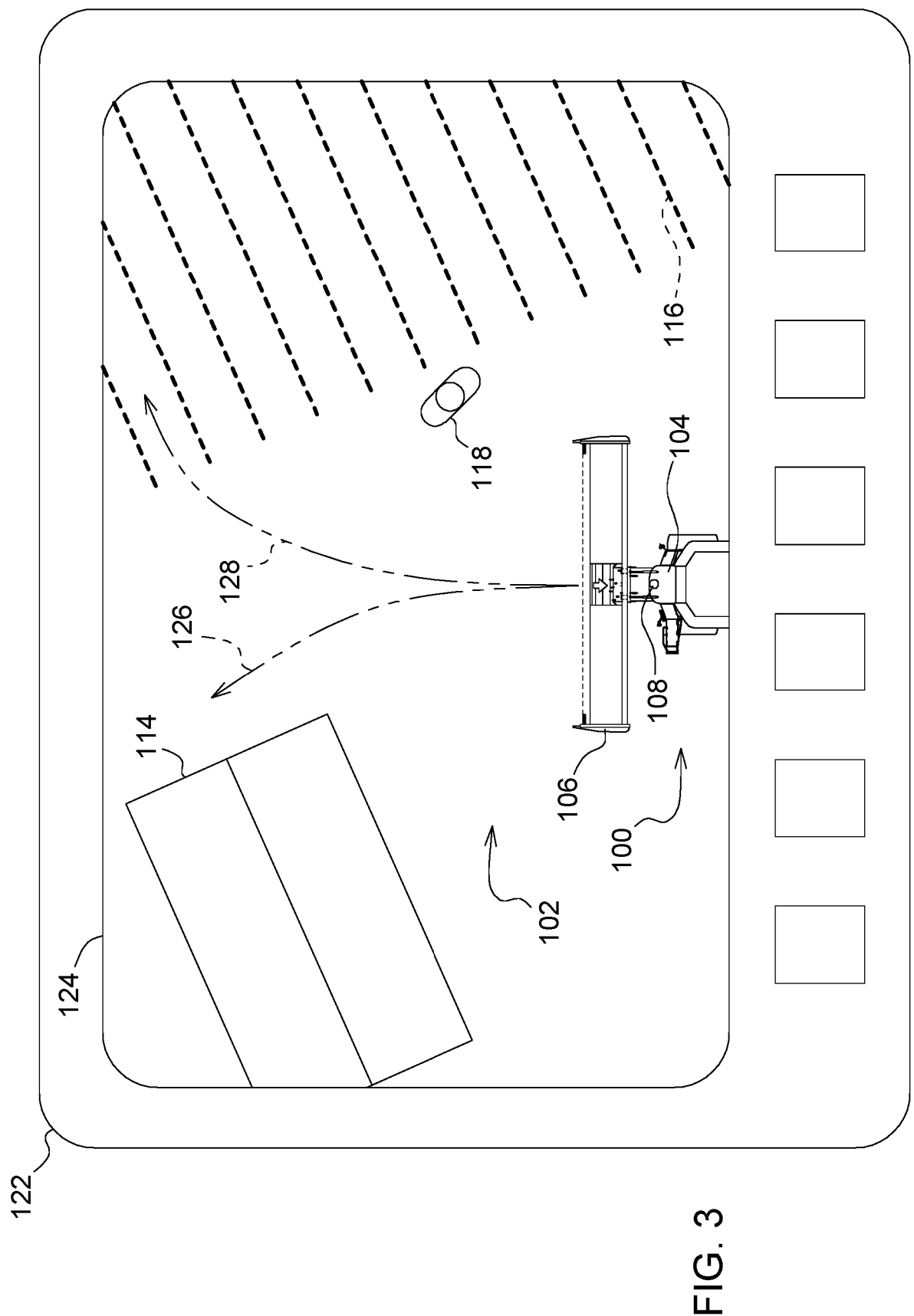
FIG. 3 is a display visible to the operator of the work vehicle in the cab of the work vehicle.

FIGS. 1-3 illustrate various views and components of a work vehicle 100 operating in an environment 102 surrounding the work vehicle 100. The work vehicle 100 has an operator station 104, or cab, from which an operator may control the work vehicle 100 or an attachment 106 included in the work vehicle 100, in this case a header. The work vehicle 100 also has a sensor 108 which can sense one or more aspects of the environment 102. The sensor 108 may directly sense an aspect of the environment 102, such as with a camera, radar, lidar, thermal imager, or ultrasonic sensor. The sensor 108 may also indirectly sense an aspect of the environment 102, such as a satellite navigation receiver which provides the position of the work vehicle 100, then can use that position to reference a database to find items in the environment 102 surrounding the work vehicle 100 such as roads, fields, buildings, or addresses. A VCU 110, which may also be referred to as a Vehicle Control Unit or a controller, is also included in the work vehicle 100 and is used to gather sensor data, run algorithms and stored programs, and provide control of the work vehicle 100.

FIG. 1 depicts the view from a perspective of an operator sitting in the operator station 104 of the work vehicle 100. The operator may view the environment 102 through a windshield 112 of the operator station 104, and such view may include an item of interest 112 such as a building 114, crop rows 116, or a person 118, or other items of interest such as entry points to a road, field, or building, or other vehicles. The operator may control the work vehicle 100 through operator inputs such as an operator input 120, illustrated as a joystick in this embodiment but which could be a wheel, rocker, or other input types. The operator may steer the work vehicle 100 to the left by actuating the operator input 120 to the left, and steer right by actuating it to the right, such that greater actuation (displacement) of the operator input 120 is associated with increased steering of the work vehicle 100. The operator may also see a display 122 while operating the work vehicle 100, with the display 122 mounted in the operator station 104 in a position visible to the operator during operation of the work vehicle 100.

FIG. 2 is a view of the operator input 120 with multiple different positions illustrated. The operator input 120 may be in a neutral position 120*a*, in which no steering command is being issued, to which it is spring-loaded to return absent an external force. The operator input 120 may be in partially actuated positions 120*b* and 120*c*, commanding steering to the left and right respectively, which may also be referred to as threshold steering positions or actuations of at least a threshold angle $\Theta_1$. The operator input 120 may also be in fully actuated positions 120*e* and 120*d*, commanding maximum steering to the left and right respectively, which may also be referred to as maximum steering positions or actuations of at least, or approximately, angle $\Theta_2$.

FIG. 3 is a view of the display 122, which is displaying a user interface 124 in this embodiment which includes multiple items of an interest in the environment 102, such as the building 114, the crop rows 116, and the person 118. The user interface 124 also includes a first path 126 leading toward the building 114 and a second path 128 leading toward the crops rows 116.

Figure 4:
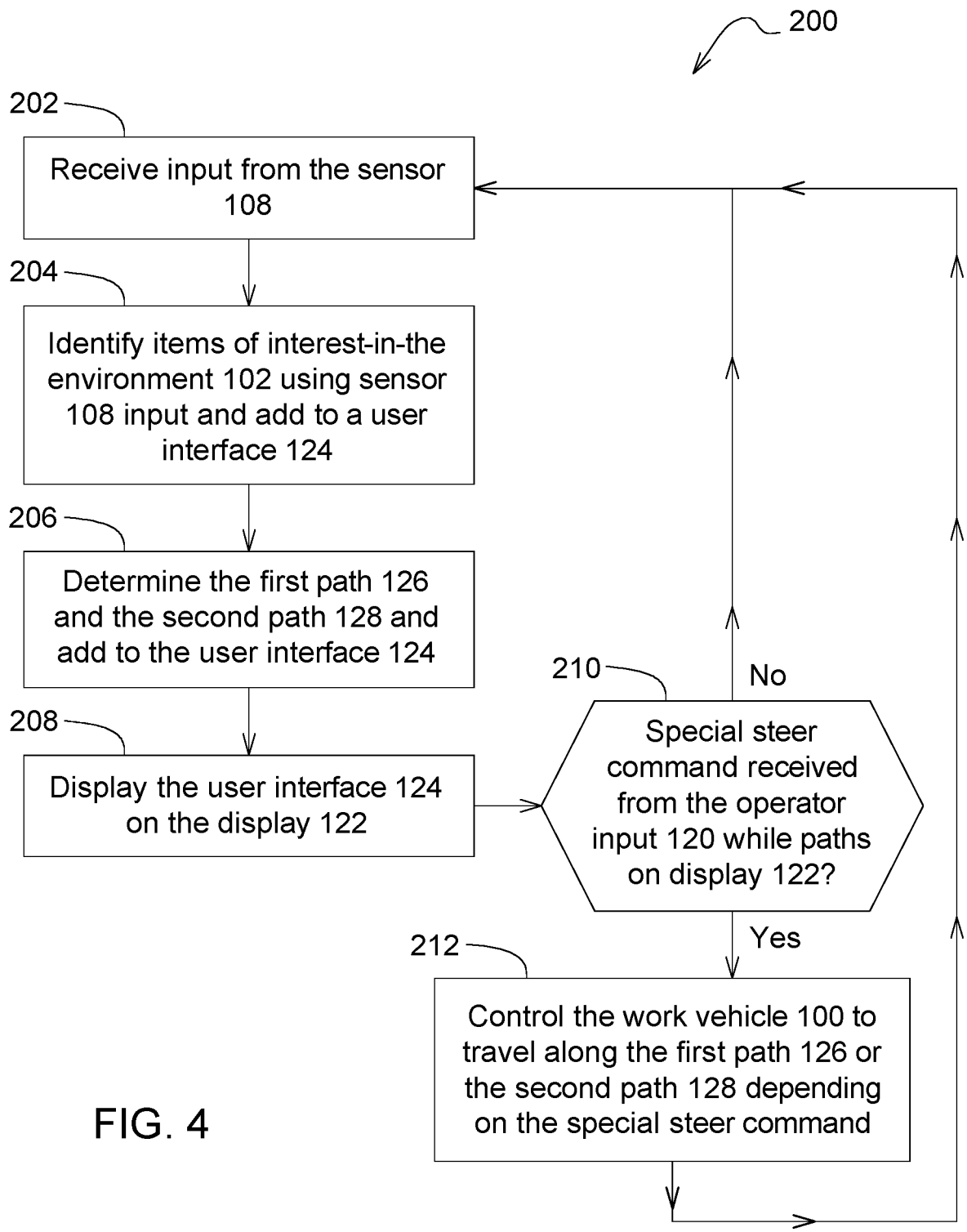
FIG. 4 is a flowchart of a control system for selecting a path for the work vehicle.

FIG. 4 is a flowchart of a control system 200 which the VCU 110 may execute to generate and display the user interface 124. In step 202, the VCU 110 of the work vehicle 100 is in communication with the sensor 108 and the operator input 120 and receives input therefrom. In this embodiment, the sensor 108 senses the environment 102 surrounding the work vehicle 100 by using a camera to capture images of the environment in front of the work vehicle 100 and by using a satellite navigation receiver (e.g., a GNSS receiver) to determine the position, heading, and velocity of the work vehicle 100.

In step 204, the VCU 110 identifies items of interest in the environment 102 surrounding the work vehicle 100 using the input received from the sensor 108. The building 114 and the crop rows 116 are identified by comparing the location of the work vehicle 100, determined using input received from the satellite navigation receiver of the sensor 108, with the known locations of the building 114 and the crop rows 116 from a database (e.g., a map) accessed by the VCU 110. This database may reside in the memory of the VCU 110, or the VCU 110 may use a wireless data network to access a database stored on a remote server. With the known position and heading of the work vehicle 100 from the satellite navigation receiver of the sensor 108, the VCU 110 can retrieve a map which includes a plurality of nearby items of interest, such as the building 114 and the crop rows 116, marked or displayed in the retrieved map. The VCU 110 can then add additional items of interest to the map to form the user interface 124. As one example, the VCU 110 can identify the person 118 in the environment 102 by applying a trained neural network algorithm to the raw image data received from the camera of the sensor 108 (using known techniques in the field), and then place an indicator or icon representing the person on the user interface 124. As another example, the VCU 110 can superimpose a rendered image of the work vehicle 100 on the user interface 124.

In step 206, the VCU 110 determines the first path 126 and the second path 128 in order to add those to the user interface 124. The VCU 110 can use at least one of the work vehicle's position, heading, and velocity, from the satellite navigation receiver of the sensor 108, to determine a path toward the building 114 (the first path 126) and a path toward the crop rows 116 (the second path 128), both of which are items of interest that the VCU 110 identified in the environment 102. These paths can be created using techniques known in the art of mapping and navigation. In an alternative embodiment, one of the first path 126 or the second path 128 could lead away from an item of interest, such as the person 118, instead of toward an item of interest.

In step 208, the VCU 110 displays the user interface 124 on the display 122. At this point, the user interface 124 includes the map retrieved using position and heading information from the sensor 108 with representations of the building 114 and the crop rows 116, an indicator for the person 118, a rendered image of the work vehicle 100, and representations of both the first path 126 and the second path 128, can then be displayed by the VCU 110 on the display 122. The operator of the work vehicle 100 can then receive a view of the user interface 124 such as that shown in FIG. 3.

Prior to seeing the first path 126 and the second path 128 included in the user interface 124 and shown on the display 122, the operator may steer the work vehicle by actuating the operator input 120, as described with regarding to FIG. 2. Upon seeing the first path 126 and the second path 128 on the user interface 124, the operator may make a path selection by actuating the operator input 120 with a special steer command. In step 210, the VCU 110 determines whether it received this special steer command and proceeds to step 212 if it has, and step 202 if it has not. This special steer command is a distinct actuation of the operator input 120 that would normally cause the work vehicle 100 to be steered according to the command, but which will instead cause the VCU 110 to autonomously control the work vehicle 100 to travel along one of the first path 126 or the second path 128 if the special steer command is received while such paths appear on the user interface 124. One example of a special steer command is to actuate the operator input 120 past a threshold steering position, such as the partially actuated positions 120*b* or 120*c*, which would command the VCU 110 to autonomously travel along the first path 126 or the second path 128, respectively. Another example of a special steering command is to actuate the operator input 120 to the fully actuated positions 120*e* or 120*d*, which would command the VCU 110 to autonomously travel along the first path 126 or the second path 128, respectively. Another example of a special steering command would be a "stab" on the operator input 120, which would be a rapidly applied and removed actuation of the operator input 120 (often, at approximately the highest speed an operator may comfortably perform a momentary actuation), such that a leftward stab or rightward stab would command the VCU 110 to autonomously travel along the first path 126 or the second path 128, respectively.

In step 212, the VCU 110 autonomously controls the work vehicle 100 to travel along the first path 126 or the second path 128 if the special steer command was received while the first path 126 or the second path 128 was being displayed on the display 122 at the time the special steer command was received. The autonomous control of a vehicle to travel along a defined path or route can be performed according to known techniques in the art. While the VCU 110 is autonomously controlling the work vehicle 100 to travel along a path, the operator may cease such autonomous navigation in a number of different ways, such as by actuating the operator input 120 or another input (e.g., a brake pedal, an accelerator pedal, or a button appearing on the user interface 124).

Should the operator not give the special steer command in step 210, the VCU 110 may cycle through steps 202 through 208 until the operator does provide such a command. In this way, the VCU 110 may update one or both of the first path 126 and the second path 128 to reflect changes in position, heading, or velocity of the work vehicle 100. The first path 126 and the second path 128 may also point to different identified items of interest as the position of the work vehicle 100 changes, for example selecting a new item of interest as the destination for the first path 126 if the work vehicle 100 passes the building 114. The operator may thus operate the work vehicle 100 manually, steering it via the actuation of the operator input 120, until the operator sees a suggested path on the user interface 124 which the operator wants the VCU 110 to autonomously follow and only then issue the special steering command.

Without in any way limiting the scope, interpretation, or application of the claims appearing below, a technical effect of one or more of the example embodiments disclosed herein is to provide the operator of a work vehicle 100 with a user interface and input method and system that allows for both manual and autonomous control, and the selection of autonomous control along dynamically created path suggestions as the work vehicle 100 is operated.

As used herein, "controller" is intended to be used consistent with how the term is used by a person of skill in the art, and refers to a computing component with processing, memory, and communication capabilities which is utilized to control or communicate with one or more other components. In certain embodiments, a controller may also be referred to as a control unit, vehicle control unit (VCU), engine control unit (ECU), or transmission control unit (TCU). In certain embodiments, a controller may be configured to receive input signals in various formats (e.g., hydraulic signals, voltage signals, current signals, CAN messages, optical signals, radio signals), and to output command signals in various formats (e.g., hydraulic signals, voltage signals, current signals, CAN messages, optical signals, radio signals).

VCU 110 is in communication with the sensor 108, operator input 120, and other components on work vehicle 100. In the embodiment shown in FIGS. 1-3, VCU 110 is electrically connected to these other components by a wiring harness such that messages, commands, and electrical power may be transmitted between VCU 110 and the other components, but alternative embodiments may employ wireless communications and/or power transmission as is known in the art. For the sake of brevity, conventional techniques and arrangements related to signal processing, data transmission, signaling, control, and other aspects of the systems disclosed herein may not be described in detail.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method for controlling a work vehicle, comprising:
    sensing a surrounding environment of the work vehicle with a sensor;
    identifying an item of interest in the environment;
    determining a path using at least one of the work vehicle's position, heading, and velocity, the path leading toward or around the item of interest;
    displaying, on an operator display visible to an operator of the work vehicle, the path;
    receiving, from an operator input used to steer the work vehicle, a special steer command;
    steering the work vehicle based on the special steer command if the special steer command is received when no path is being displayed on the operator display; and
    autonomously controlling the work vehicle to travel along the path based on the special steer command if the special steer command is received while the path is being displayed on the operator display.

2. The method of claim 1, wherein sensing the environment with a sensor comprises sensing the position of the work vehicle with a GNSS receiver.

3. The method of claim 2, wherein the item of interest is identified by comparing the position of the work vehicle and the known positions of a plurality of items of interest.

4. The method of claim 3, wherein the item of interest is an entry-point to a road.

5. The method of claim 3, wherein the item of interest is an entry-point to a field.

6. The method of claim 3, wherein the item of interest is an entry-point to a building.

7. The method of claim 1, wherein sensing the environment with a sensor comprises receiving images from a camera with a field of view of the environment.

8. The method of claim 7, wherein the item of interest is identified using the images from the camera.

9. The method of claim 8, wherein the item of interest is identified using a neural network.

10. The method of claim 8, wherein the item of interest is another vehicle.

11. The method of claim 8, wherein the item of interest is a row of crop in a field.

12. The method of claim 1, wherein the operator input is a joystick.

13. The method of claim 12, wherein the special steer command is actuating the joystick past a threshold steering position.

14. The method of claim 12, wherein the special steer command is actuating the joystick to a maximum steering position.

15. The method of claim 12, wherein the special steer command is a stab movement.

16. The method of claim 1, further comprising:
    determining an updated path when at least one of the work vehicle's position, heading, and velocity changes, the updated path leading toward or around the item of interest;
    displaying, on the operator display, the updated path;
    steering the work vehicle based on the special steer command if the special steer command is received when neither the path nor updated path is being displayed on the operator display; and
    autonomously controlling the work vehicle to travel along the updated path based on the special steer command if the special steer command is received while the updated path is being displayed on the operator display.

17. The method of claim 1, wherein the item of interest is a first item of interest, the path is a first path, the method further comprising:
    determining a second path using at least one of the work vehicle's position, heading, and velocity, the second path leading toward or around the first item of interest but different than the first path or the second path leading toward or around a second item of interest identified in the environment;
    displaying the second path on the operator display;
    determining if the special steer command is a left special steer command, commanding the work vehicle to steer to the left, or a right special steer command, commanding the work vehicle to steer to the right;
    steering the work vehicle to the left if the left special steer command is received when the first path is not being displayed on the operator display;
    steering the work vehicle to the right if the right special steer command is received when the second path is not being displayed on the operator display;
    autonomously controlling the work vehicle to travel along the first path if the left special steer command is received while the first path is being displayed on the operator display; and
    autonomously controlling the work vehicle to travel along the second path if the right special steer command is received while the second path is being displayed on the operator display.

18. The method of claim 17, wherein the operator input is a joystick, the left special steer command comprises actuating the joystick to the left, and the right special steer command comprises actuating the joystick to the right.

19. The method of claim 18, wherein the left special steer command comprises actuating the joystick to the left past a displacement threshold and the right special steer command comprises actuating the joystick to the right past the displacement threshold.

20. The method of claim 18, wherein the left special steer command comprises actuating the joystick to a maximum left position and the right special steer command comprises actuating the joystick to a maximum right position.

* * * * *